(12) United States Patent
Ni et al.

(10) Patent No.: US 10,499,261 B2
(45) Date of Patent: Dec. 3, 2019

(54) NETWORK COMMUNICATION METHOD AND APPARATUS

(71) Applicant: Huawei Technologies Co., Ltd., Shenzhen (CN)

(72) Inventors: Rui Ni, Shenzhen (CN); Chenghui Peng, Munich (DE); Xing Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 321 days.

(21) Appl. No.: 15/442,294

(22) Filed: Feb. 24, 2017

(65) Prior Publication Data
US 2017/0164218 A1    Jun. 8, 2017

Related U.S. Application Data

(63) Continuation of application No. PCT/CN2014/085214, filed on Aug. 26, 2014.

(51) Int. Cl.
*H04W 24/02* (2009.01)
*H04W 48/18* (2009.01)
(Continued)

(52) U.S. Cl.
CPC ........... *H04W 24/02* (2013.01); *H04W 24/08* (2013.01); *H04W 36/0072* (2013.01);
(Continued)

(58) Field of Classification Search
CPC ..... H04W 24/02; H04W 24/08; H04W 48/18; H04W 72/04
(Continued)

(56) References Cited

U.S. PATENT DOCUMENTS

| | | | | |
|---|---|---|---|---|
| 2007/0091848 A1* | 4/2007 | Karia | ................ | H04L 29/06027 370/331 |
| 2007/0094374 A1* | 4/2007 | Karia | ................ | H04L 29/06027 709/223 |

(Continued)

FOREIGN PATENT DOCUMENTS

| | | |
|---|---|---|
| CN | 101248690 A | 8/2008 |
| CN | 101772941 A | 7/2010 |

(Continued)

OTHER PUBLICATIONS

Guang, "Common Link Layer Technology in Heterogeneous Wireless Access Networks", Huawei, and submitted by the applicant as prior art (Year: 2005).*

(Continued)

*Primary Examiner* — Jamaal Henson
(74) *Attorney, Agent, or Firm* — Slater Matsil, LLP

(57) ABSTRACT

Embodiments provide a network communication method, including obtaining, by a second convergence control apparatus after receiving an indication message sent by a first convergence control apparatus, a preset proportion of service data from service data that the first convergence control apparatus needs to transmit and performing, by the second convergence control apparatus, parameter matching on the preset proportion of service data according to a system parameter of a current communications standard The method also includes transmitting, by the second convergence control apparatus, the matched preset proportion of service data by using a corresponding data link layer. The embodiments further disclose a network communications apparatus.

24 Claims, 10 Drawing Sheets

(51) Int. Cl.
  *H04W 24/08* (2009.01)
  *H04W 72/04* (2009.01)
  *H04W 36/00* (2009.01)
  *H04W 36/14* (2009.01)
  *H04W 88/10* (2009.01)
  *H04W 84/12* (2009.01)

(52) U.S. Cl.
  CPC ....... *H04W 36/0083* (2013.01); *H04W 36/14* (2013.01); *H04W 48/18* (2013.01); *H04W 72/04* (2013.01); *H04W 88/10* (2013.01); *H04W 84/12* (2013.01)

(58) Field of Classification Search
  USPC ........................................................ 370/252
  See application file for complete search history.

(56) References Cited

U.S. PATENT DOCUMENTS

| | | |
|---|---|---|
| 2008/0225829 A1 | 9/2008 | Sachs et al. |
| 2009/0069018 A1 | 3/2009 | Babbar |
| 2011/0310851 A1 | 12/2011 | Klingenbrunn et al. |
| 2012/0014273 A1* | 1/2012 | Notton .............. H04W 36/0022 370/252 |

FOREIGN PATENT DOCUMENTS

| | | |
|---|---|---|
| CN | 102497660 A | 6/2012 |
| CN | 103152789 A | 6/2013 |
| CN | 103986560 A | 8/2014 |
| EP | 1708526 A1 | 10/2006 |

OTHER PUBLICATIONS

Guang, "Common Link Layer Technology in Heterogeneous Wireless Access Networks", Huawei (Year: 2005).*

Yang Guang et al., "Common Link Layer Technology in Heterogeneous Wireless Access Networks" Radio Engineering, vol. 35, No. 10, 2005, pp. 19-22.

* cited by examiner

NETWORK COMMUNICATION METHOD AND APPARATUS

CROSS-REFERENCE TO RELATED APPLICATIONS

This application is a continuation of International Patent Application No. PCT/CN2014/085214, filed on Aug. 26, 2014, the disclosure of which is hereby incorporated by reference in its entirety.

TECHNICAL FIELD

Embodiments relate to the field of wireless communications, and in particular, to a network communication method and apparatus.

BACKGROUND

With the rapid development of communications technologies and the popularization of intelligent user terminals, a user terminal may support communications systems of multiple communications standards, such as a wireless cellular network, WiFi (Wireless Fidelity), Worldwide Interoperability for Microwave Access (WiMAX), Bluetooth, infrared or another communications standard. The user terminal may select a communications standard according to a policy to perform data communication. There are many specific standard selection policies that commonly include: minimum traffic costs, a fastest download speed, minimum battery energy consumption, default WiFi-priority, and the like.

To meet differentiated requirements of multiple communications standards or multiple connections of a user terminal, a wireless network evolution trend is to accelerate a development in heterogeneous convergence of a wireless cellular network and a wireless local area network. An existing architecture of communications network convergence includes two parts: a core network (CN) and an radio access network (RAN). Specifically, the core network includes a control plane and a user plane that include network elements such as a gateway GPRS support node (GGSN)/a packet data gateway (PGW), a serving GPRS support node (SGSN), and a serving gateway (SGW), and a user information database that includes auxiliary network elements such as a home subscriber server (HSS), a policy and charging rules function (PCRF) unit, an Authentication Authorization Accounting server (AAA Server), and an access network discovery and selection function (ANDSF) unit. The access network includes a wireless cellular network that includes a base station controller (BSC)/a radio network controller (RNC), a base transceiver station (BTS)/a base station NodeB/an evolved NodeB eNodeB, and the like, and also includes a WLAN network that includes a wireless local area network (WLAN) access point (AP). In addition, another convergence solution for a wireless cellular network and a WLAN network is to add a Wireless Fidelity controller (WIC) to the RAN. The WIC uses a set of custom interfaces to communicate with a BSC on a second-generation wireless cellular network, an RNC on a third-generation wireless cellular network, and a mobility management entity (MME) on a fourth-generation wireless cellular network.

In the prior art, all convergence solutions for a wireless cellular network and a wireless local area network are network convergence manners that work at and above a network layer, and a network convergence node is a GGSN/PGW or a WIC. A user terminal and an Internet service server are regarded as two ends of a user service flow. When the service flow switches between the wireless cellular network and the WLAN network on the GGSN/PGW or the WIC, the service flow may use completely different Internet Protocol (IP) addresses and routing trails, resulting in a service flow interruption. In addition, due to use of a resource reservation strategy in a licensed spectrum, the wireless cellular network ensures better quality of service (QoS); due to use of a shared competition strategy in a non-licensed spectrum, the WLAN network cannot ensure good quality of service. A QoS difference that results from spectrum allocation strategies of different communications standards may make it difficult to keep consistency of user experience after a communications standard is switched. In conclusion, the prior art has the following problem: during communications standard switching, a temporary service flow interruption is caused, and after the switching, consistency of user experience cannot be ensured.

SUMMARY

A technical issue to be resolved in embodiments is to provide a network communication method and apparatus that can resolve a prior-art problem that a temporary service flow interruption results from communications standard switching and that consistency of user experience cannot be ensured.

To resolve the foregoing technical issue, a first aspect of the embodiments provides a network communication method, including obtaining, by a second convergence control apparatus after receiving an indication message sent by a first convergence control apparatus, a preset proportion of service data from service data that the first convergence control apparatus needs to transmit and performing, by the second convergence control apparatus, parameter matching on the preset proportion of service data according to a system parameter of a current communications standard. The method also includes transmitting, by the second convergence control apparatus, the matched preset proportion of service data by using a corresponding data link layer.

With reference to the first aspect, in a first possible implementation manner, before the obtaining, by a second convergence control apparatus after receiving an indication message sent by a first convergence control apparatus, a preset proportion of service data from service data that the first convergence control apparatus needs to transmit, the method further includes: measuring, by the second convergence control apparatus, latency between the first convergence control apparatus and the second convergence control apparatus, and adjusting, according to the latency obtained after the measurement, duration of a timeout timer corresponding to the first convergence control apparatus.

With reference to the first possible implementation manner of the first aspect, in a second possible implementation manner, the measuring, by the second convergence control apparatus, latency between the first convergence control apparatus and the second convergence control apparatus includes: sending, by the second convergence control apparatus to the first convergence control apparatus, a detection message that carries a sending time, so that the first convergence control apparatus returns, after receiving the detection message, a response message that carries a receiving time; and calculating, by the second convergence control apparatus, the latency between the first convergence control apparatus and the second convergence control apparatus according to the sending time and the receiving time.

With reference to any one of the first aspect, or the first to the second possible implementation manners of the first aspect, in a third possible implementation manner, the performing, by the second convergence control apparatus, parameter matching on the preset proportion of service data according to a system parameter of a current communications standard includes: performing, by the second convergence control apparatus, rate matching, packet length matching, quality of service matching or security matching on the preset proportion of service data according to the system parameter of the current communications standard.

A second aspect of the embodiments provides a network communication method, including monitoring, by a first convergence control apparatus, a link performance parameter of a current first communications standard and determining, by the first convergence control apparatus according to the link performance parameter, whether a second communications standard needs to be used to transmit service data. The method also includes if the second communications standard needs to be used, sending, by the first convergence control apparatus, an indication message to a second convergence control apparatus corresponding to the second communications standard, so that the second convergence control apparatus transmits a preset proportion of the service data by using a corresponding data link layer.

With reference to the second aspect, in a first possible implementation manner, before the sending, by the first convergence control apparatus, an indication message to a second convergence control apparatus corresponding to the second communications standard, the method further includes: if the second communications standard belongs to a communications standard that uses a spectrum resource reservation strategy, applying for a transmission resource from a resource manager of the second communications standard, where the communications standard that uses the spectrum resource reservation strategy includes a wireless cellular network and Worldwide Interoperability for Microwave Access (WiMAX).

With reference to the second aspect or the first possible implementation manner, in a second possible implementation manner, the monitoring, by a first convergence control apparatus, a link performance parameter of a current first communications standard includes: monitoring, by the first convergence control apparatus, a throughput, a cache queue length, or a quantity of on-line authenticated users of the current first communications standard.

With reference to the second possible implementation manner of the second aspect, in a third possible implementation manner, the determining, by the first convergence control apparatus according to the link performance parameter, whether a second communications standard needs to be used to transmit service data includes: comparing the throughput, the cache queue length or the quantity of the on-line authenticated users of the first communications standard with a corresponding preset threshold; and if the throughput, the cache queue length or the quantity of the on-line authenticated users is greater than the corresponding preset threshold, determining that the second communications standard needs to be used to transmit the service data.

With reference to any one of the second aspect, or the first to the third possible implementation manners of the second aspect, in a fourth possible implementation manner, the method further includes: measuring, by the first convergence control apparatus, latency between the first convergence control apparatus and the second convergence control apparatus, and adjusting, according to the latency obtained after the measurement, duration of a timeout timer corresponding to the second convergence control apparatus.

With reference to the fourth possible implementation manner of the second aspect, in a fifth possible implementation manner, the measuring, by the first convergence control apparatus, latency between the first convergence control apparatus and the second convergence control apparatus includes: sending, by the first convergence control apparatus to the second convergence control apparatus, a detection message that carries a sending time, so that the second convergence control apparatus returns, after receiving the detection message, a response message that carries a receiving time; and calculating, by the first convergence control apparatus, the latency between the first convergence control apparatus and the second convergence control apparatus according to the sending time and the receiving time.

With reference to any one of the second aspect, or the first to the fifth possible implementation manners of the second aspect, in a sixth possible implementation manner, the method further includes: if the first convergence control apparatus determines that a to-be-transmitted data packet is already transmitted by using the second communications standard, discarding the to-be-transmitted data packet.

With reference to any one of the second aspect, or the first to the sixth possible implementation manners of the second aspect, in a seventh possible implementation manner, the method further includes: receiving, by the first convergence control apparatus, an ACK feedback message or a negative acknowledgement (NACK) feedback message sent by the second convergence control apparatus, where the acknowledgement feedback message is a message sent by the second convergence control apparatus after confirming correct transmission of the preset proportion of the service data, and the negative acknowledgement feedback message is a message sent by the second convergence control apparatus after confirming incorrect transmission of the preset proportion of the service data.

A third aspect of the embodiments provides a convergence control apparatus, including: an obtaining module, configured to obtain, after receiving an indication message sent by a first convergence control apparatus, a preset proportion of service data from service data that the first convergence control apparatus needs to transmit; a matching module, configured to perform parameter matching on the preset proportion of service data according to a system parameter of a current communications standard; and a transmission module, configured to transmit the matched preset proportion of service data by using a corresponding data link layer.

With reference to the third aspect, in a first possible implementation manner, the apparatus further includes: an adjustment module, configured to measure latency between the convergence control apparatus and the first convergence control apparatus, and adjust, according to the latency obtained after the measurement, duration of a timeout timer corresponding to the first convergence control apparatus.

With reference to the first possible implementation manner of the third aspect, in a second possible implementation manner, the adjustment module includes: a first unit, configured to send, to the first convergence control apparatus, a detection message that carries a sending time, so that the first convergence control apparatus returns, after receiving the detection message, a response message that carries a receiving time; and a second unit, configured to calculate the latency between the convergence control apparatus and the first convergence control apparatus according to the sending time and the receiving time.

With reference to any one of the third aspect, or the first to the second possible implementation manners of the third aspect, in a third possible implementation manner, the matching module is configured to perform rate matching, packet length matching, quality of service matching or security matching on the preset proportion of service data according to the system parameter of the current communications standard.

A fourth aspect of the embodiments provides a convergence control apparatus, including: a monitoring module, configured to monitor a link performance parameter of a current first communications standard; a judging module, configured to determine, according to the link performance parameter, whether a second communications standard needs to be used to transmit service data; and an instruction module, configured to: if the second communications standard needs to be used, send an indication message to a second convergence control apparatus corresponding to the second communications standard, so that the second convergence control apparatus transmits a preset proportion of the service data by using a corresponding data link layer.

With reference to the fourth aspect, in a first possible implementation manner, the apparatus further includes: a resource applying module, configured to: if the second communications standard belongs to a communications standard that uses a spectrum resource reservation strategy, apply for a transmission resource from a resource manager of the second communications standard, where the communications standard that uses the spectrum resource reservation strategy includes a wireless cellular network and WiMAX.

With reference to the fourth aspect or the first possible implementation manner, in a second possible implementation manner, the monitoring module is specifically configured to monitor a throughput, a cache queue length, or a quantity of on-line authenticated users of the current first communications standard.

With reference to the second possible implementation manner of the fourth aspect, in a third possible implementation manner, the judging module includes: a comparison unit, configured to compare the throughput, the cache queue length or the quantity of the on-line authenticated users of the first communications standard with a corresponding preset threshold; and a determining unit, configured to: if the throughput, the cache queue length or the quantity of the on-line authenticated users is greater than the corresponding preset threshold, determine that the second communications standard needs to be used to transmit the service data.

With reference to any one of the fourth aspect, or the first to the third possible implementation manners of the fourth aspect, in a fourth possible implementation manner, the apparatus further includes: a latency adjustment module, configured to measure latency between the convergence control apparatus and the second convergence control apparatus, and adjust, according to the latency obtained after the measurement, duration of a timeout timer corresponding to the second convergence control apparatus.

With reference to the fourth possible implementation manner of the fourth aspect, in a fifth possible implementation manner, the latency adjustment module includes: a sending unit, configured to send, to the second convergence control apparatus, a detection message that carries a sending time, so that the second convergence control apparatus returns, after receiving the detection message, a response message that carries a receiving time; and a calculation unit, configured to calculate the latency between the convergence control apparatus and the second convergence control apparatus according to the sending time and the receiving time.

With reference to any one of the fourth aspect, or the first to the fifth possible implementation manners of the fourth aspect, in a sixth possible implementation manner, the apparatus further includes: a discarding module, configured to: if the first convergence control apparatus determines that a to-be-transmitted data packet is already transmitted by using the second communications standard, discard the to-be-transmitted data packet.

With reference to any one of the fourth aspect, or the first to the sixth possible implementation manners of the fourth aspect, in a seventh possible implementation manner, the apparatus further includes: a feedback receiving module, configured to receive an acknowledgement (ACK) feedback message or a NACK feedback message sent by the second convergence control apparatus, where the acknowledgement feedback message is a message sent by the second convergence control apparatus after confirming correct transmission of the preset proportion of the service data, and the negative acknowledgement feedback message is a message sent by the second convergence control apparatus after confirming incorrect transmission of the preset proportion of the service data.

Implementation of the present embodiments brings the following beneficial effects.

A convergence control apparatus is located at a data link layer of a communications standard. After receiving an indication message sent by another convergence control apparatus, the convergence control apparatus obtains a preset proportion of service data from service data that the another convergence control apparatus needs to transmit. The convergence control apparatus matches the preset proportion of service data to service data that meets the communications standard of the convergence control apparatus, and transmits the matched service data by using a corresponding data link layer. A control function of the convergence control apparatus is located at the data link layer, not at an IP layer, so that a dynamic response to a link status is more sensitive, and a decision of switching between different standards can be made faster. In addition, an operation manner of distributed convergence control apparatuses is used, and a convergence control apparatus is disposed at each data link layer, so that the convergence control apparatus is prevented from being a performance bottleneck when a system scale is large, diversification of decision algorithms can be supported, and scalability is high.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

Figure 1:
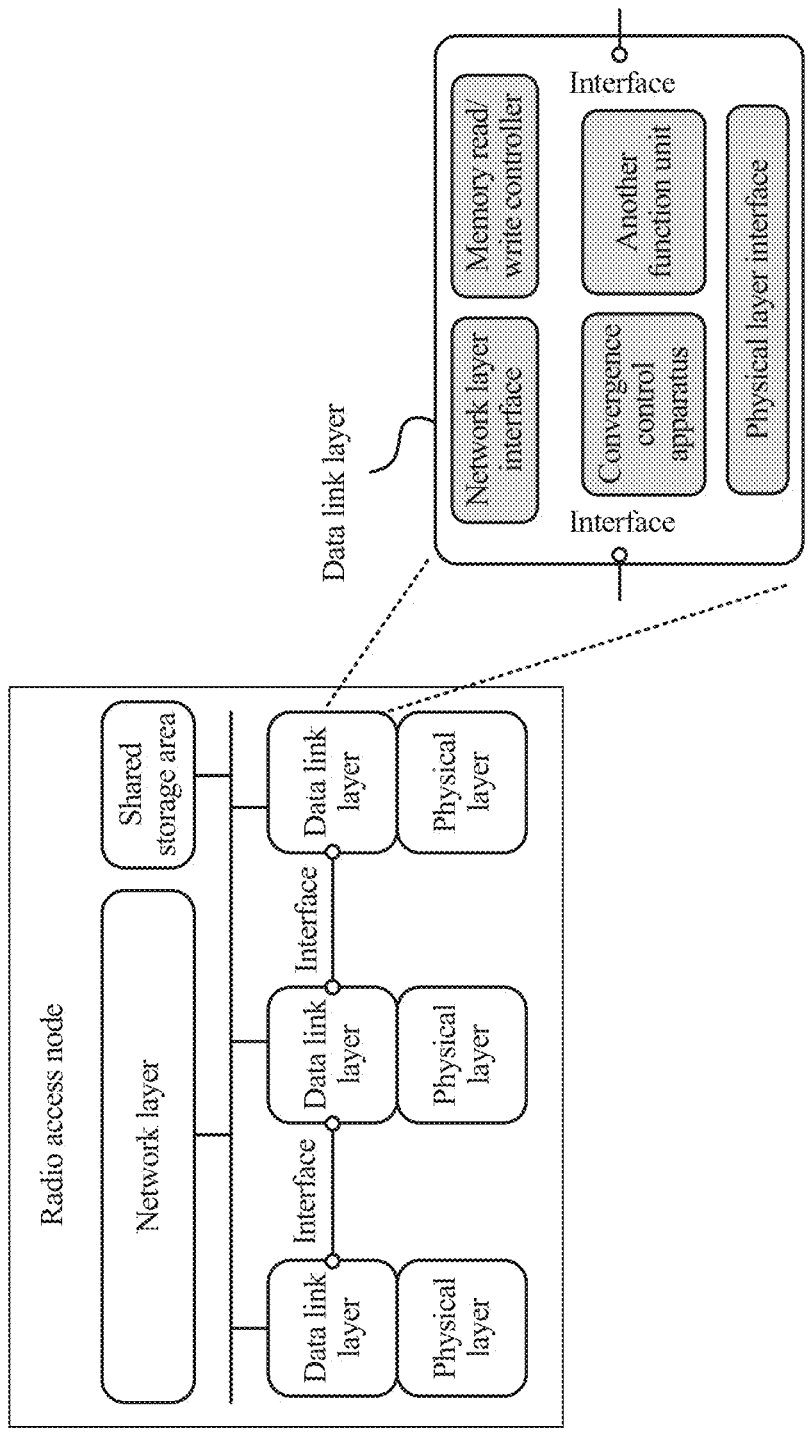
FIG. 1 is a schematic structural diagram of a radio access node according to an embodiment.

The following clearly describes the technical solutions in the embodiments with reference to the accompanying drawings in the embodiments. Apparently, the described embodiments are merely a part rather than all of the embodiments. All other embodiments obtained by a person of ordinary skill in the art based on the embodiments without creative efforts shall fall within the protection scope of the present embodiments.

Terms such as "component," "module," and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and according to, for example, a signal having one or more data packets (for example, data from one component interacting with another component in a local system, a distributed system, and/or across a network such as the Internet interacting with other systems by using the signal).

In addition, aspects or features may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a CD (compact disk), and a DVD (Digital Versatile Disk)), a smart card and a flash memory component (for example, EPROM (Erasable Programmable Read-Only Memory), a card, a stick, or a key drive). In addition, various storage media described in this specification may indicate one or more devices and/or other machine-readable media that are used to store information. The term "machine-readable media" may include but is not limited to a radio channel, and various other media that can store, contain and/or carry an instruction and/or data.

Multiple communications standards mentioned in each implementation manner include but are not limited to GSM (Global System for Mobile Communications) or CDMA (Code Division Multiple Access), WCDMA (Wideband Code Division Multiple Access), LTE (Long Term Evolution), a future 5G network standard, WiFi (Wireless Fidelity), Worldwide Interoperability for Microwave Access (WiMAX), Bluetooth, infrared, and other communications standards.

Referring to FIG. 1, FIG. 1 is a schematic diagram of a radio access node according to an embodiment and is used to describe a working principle of the radio access node.

The radio access node in FIG. 1 supports multiple communications standards, and the multiple communications standards include but are not limited to a wireless cellular network, a wireless local area network (WLAN), Worldwide Interoperability for Microwave Access (WiMAX), Bluetooth and infrared.

The radio access node shown in FIG. 1 supports three communications standards, which are respectively a first communications standard, a second communications standard, and a third communications standard in a left-to-right sequence. For each of the three communications standards, a physical layer and a data link layer that are mutually independent are included. The three communications standards share one network layer, and the network layer may be a Transmission Control Protocol/an Internet Protocol (TCP/IP) protocol running on a central processing unit (CPU). The physical layer may be a hardware module such as a chip or a board. For each communications standard, a shared storage area is also disposed in which data can be simultaneously read and written by the data link layers and the network layer in FIG. 1. At a data link layer of each communications standard, an interface used for communicating with the other data link layers, a network layer interface used for communicating with the shared network layer, and a physical layer interface used for communicating with a physical layer corresponding to the data link layer are disposed. In addition, at the data link layer, a memory read/write controller is further disposed and configured to control a data read/write operation from the data link layer to the shared storage area. At the data link layer, a convergence control apparatus is disposed and configured to take charge of coordination and interaction with the other data link layers.

Figure 2:
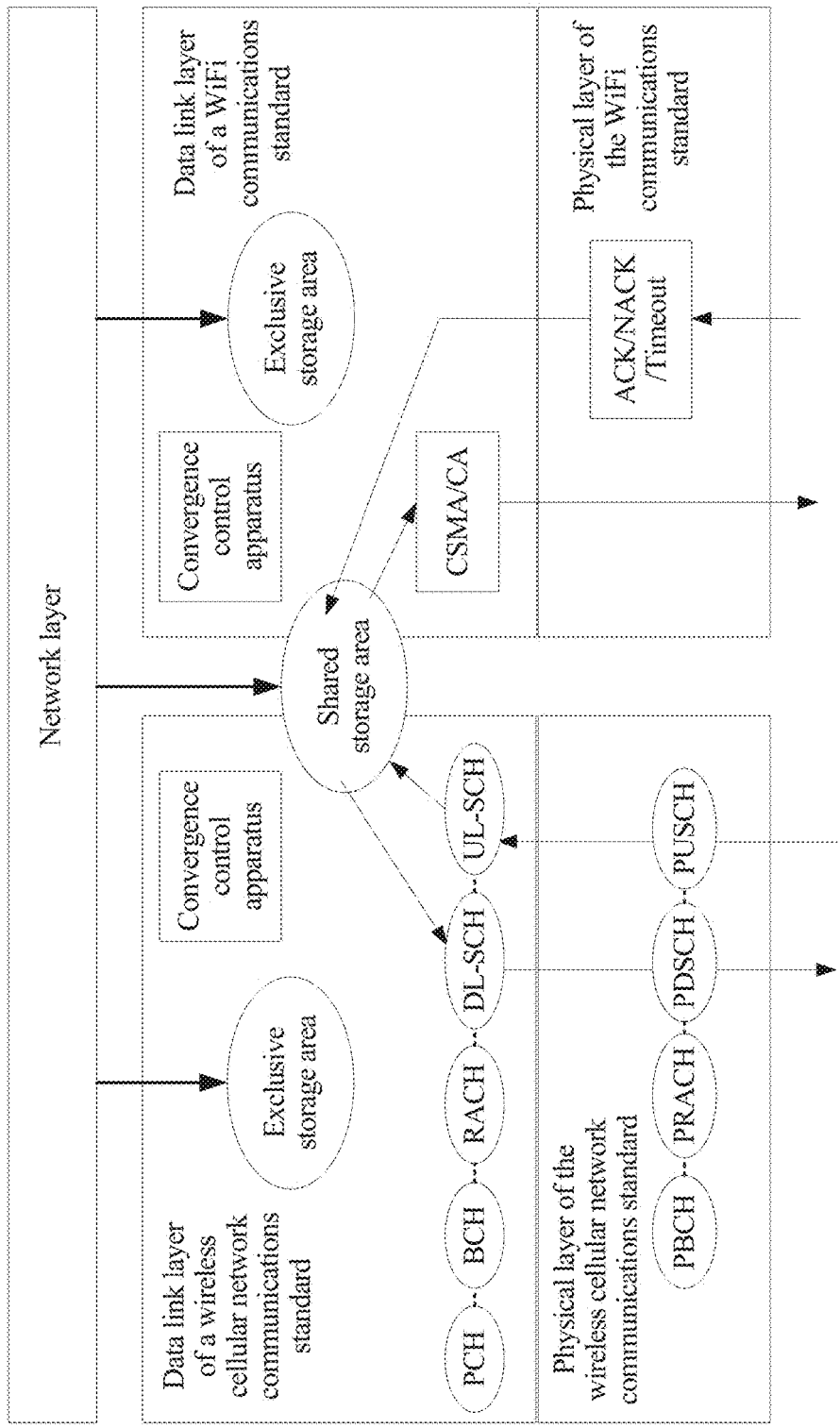
FIG. 2 is a schematic structural diagram of a protocol layer in a wireless communication method according to a first embodiment.

Referring to FIG. 2, FIG. 2 is a schematic diagram of an implementation manner of a radio access node. A wireless cellular network communications standard and a WiFi communications standard are used as examples. The wireless cellular network communications standard and the WiFi communications standard share one network layer, but at a physical layer and a data link layer, the wireless cellular network communications standard and the WiFi communications standard are mutually independent. Each of data link layers of the two communications standards may communicate with a shared network layer in FIG. 3. The data link layer of the wireless cellular network communications standard includes: a paging channel (PCH), a broadcast channel (BCH), a random access channel (RACH), a downlink shared channel (DL-SCH), and an uplink shared channel (UL-SCH). The data link layer of the WiFi communications standard includes: carrier sense multiple access with collision avoidance (CSMA/CA). The physical layer of the wireless cellular network communications standard includes: a physical broadcast channel (PBCH), a physical random access channel (PRACH), a physical downlink shared channel (PDSCH), and a physical uplink shared channel (PUSCH). At each of the data link layers of the wireless cellular network communications standard and the WiFi communications standard, a convergence control apparatus and an exclusive storage area are disposed. A shared storage area is also disposed at the radio access node and used for the network layer and the data link layers of the two communications standards to read and write data.

Figure 3:
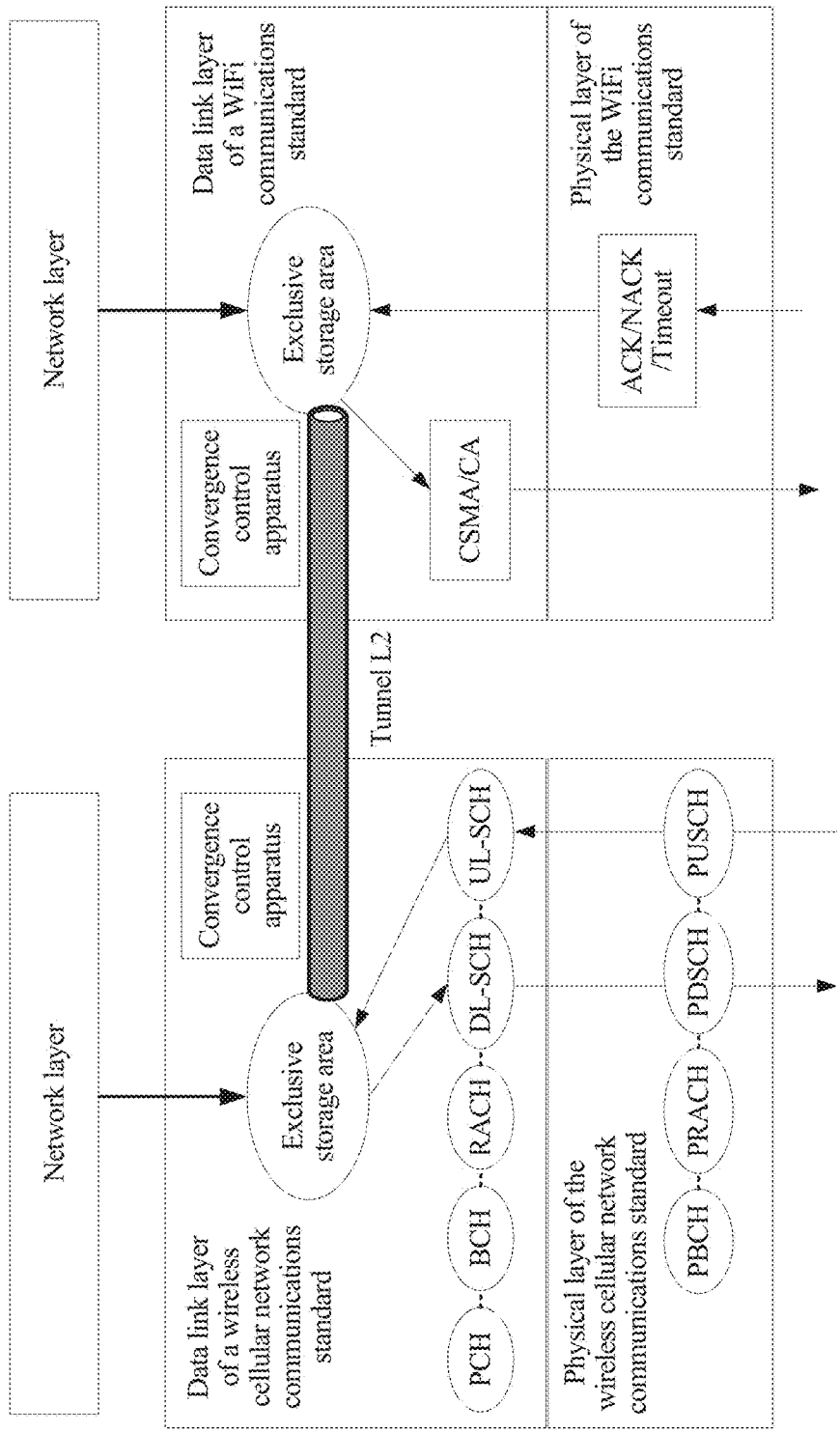
FIG. 3 is a schematic structural diagram of a protocol layer in a wireless communication method according to a second embodiment.

Referring to FIG. 3, FIG. 3 is a schematic diagram of another implementation manner of a radio access node. Different from the radio access node in FIG. 2, a wireless cellular network communications standard and a WiFi communications standard are mutually independent. Within the radio access node, network layers, physical layers, and data link layers of the two communications standards are mutually independent, and exclusive storage areas of the two communications standards are connected by using a tunnel L2.

Figure 4:
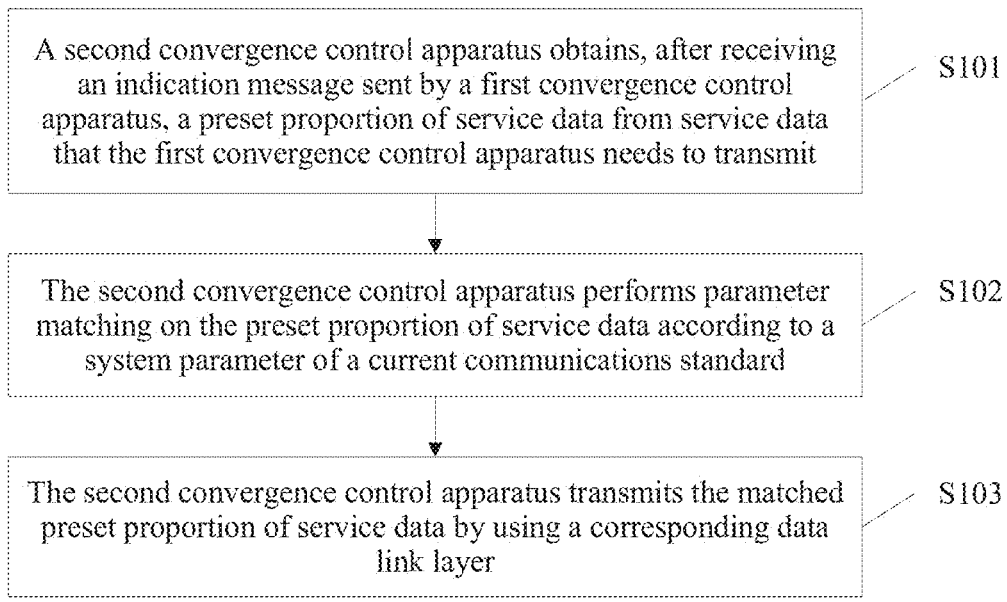
FIG. 4 is a schematic flowchart of a wireless communication method according to a first embodiment.

Referring to FIG. 4, FIG. 4 is a first schematic flowchart of a network communication method according to an embodiment. In this embodiment, the method includes.

S101. A second convergence control apparatus obtains, after receiving an indication message sent by a first convergence control apparatus, a preset proportion of service data from service data that the first convergence control apparatus needs to transmit.

Specifically, the second convergence control apparatus receives the indication message sent by the first convergence control apparatus, and the indication message is used to instruct the second convergence control apparatus to obtain the preset proportion of service data from the service data that the first convergence control apparatus needs to transmit. The indication message may carry a preset proportion of service data that needs to be carried by using a communications standard corresponding to the second convergence control apparatus, and the second convergence control apparatus obtains the service data according to the preset proportion.

Exemplarily, the second convergence control apparatus receives the indication message sent by the first convergence control apparatus. The indication message indicates that 50% of the service data needs to be carried by using the communications standard corresponding to the second convergence control apparatus, and the second convergence control apparatus obtains the 50% of the service data.

S102. The second convergence control apparatus performs parameter matching on the preset proportion of service data according to a system parameter of a current communications standard.

Specifically, because the communications standard corresponding to the second convergence control apparatus is different from a communications standard corresponding to the first convergence control apparatus, the second convergence control apparatus performs the parameter matching on the preset proportion of service data according to the system parameter of the communications standard supported by the second convergence control apparatus, so that the data meets a requirement of the current communications standard. The parameter matching includes packet length matching, quality of service matching (including rate matching) or security matching.

S103. The second convergence control apparatus transmits the matched preset proportion of service data by using a corresponding data link layer.

Specifically, after performing, at the corresponding data link layer, packet assembly and disassembly, rate adaptation, and transmission channel allocation on the data, the second convergence control apparatus transmits the data to a physical layer or a network layer, and then transmits the data by using the physical layer or the network layer.

It may be learned from the foregoing implementation manners that a control function of a convergence control apparatus is located at a data link layer, not at an internet protocol (IP) layer, so that a dynamic response to a link status is more sensitive, and a decision of switching between different standards can be made faster.

In addition, it may be learned from the foregoing implementation manners that, in a data exchange process, a data storage area is included at a data link layer, and processing does not need to be performed at an IP layer. Therefore, a process such as IP session reestablishment, IP rerouting, diverted IP sending or IP header re-resolution is not required. Therefore, after the implementation manner is used, a performance jitter time of service data is shorter. In other words, a process for wireless communication switching between different standards can be faster.

In addition, in this embodiment, an operation manner of distributed convergence control apparatuses is used, and a convergence control apparatus is disposed at each data link layer, so that the convergence control apparatus is prevented from being a performance bottleneck when a system scale is large, diversification of decision algorithms can be supported, and scalability is high.

Figure 5:
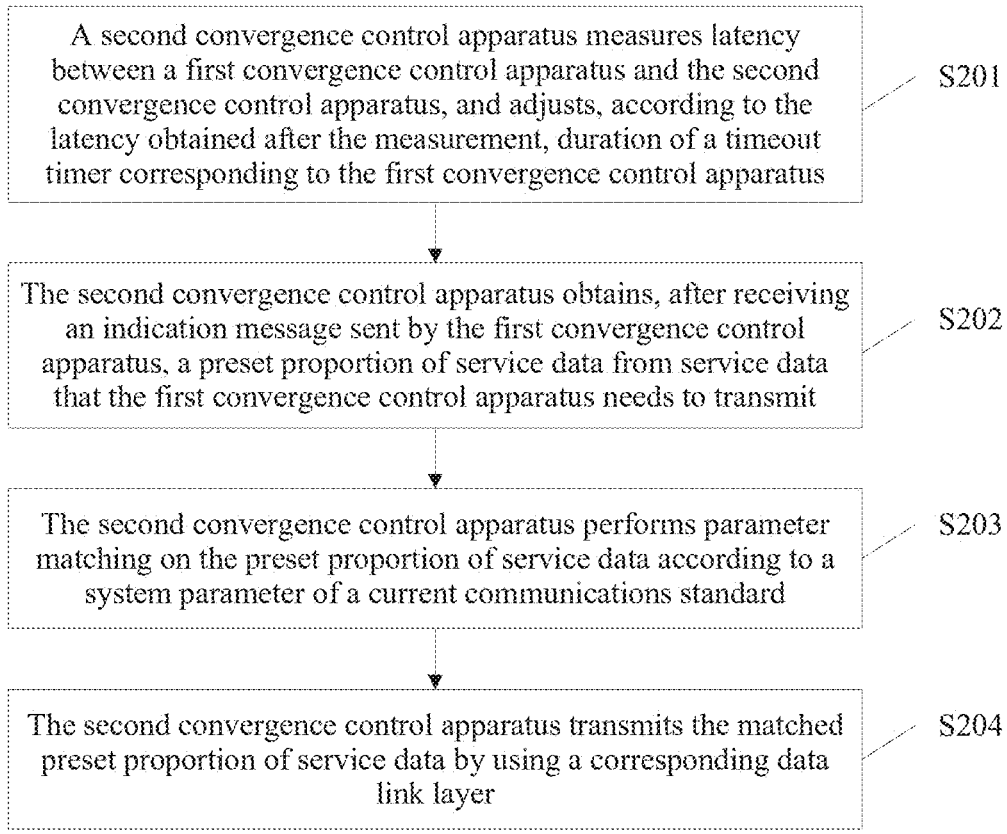
FIG. 5 is a schematic flowchart of a wireless communication method according to a second embodiment.
Figure 6:
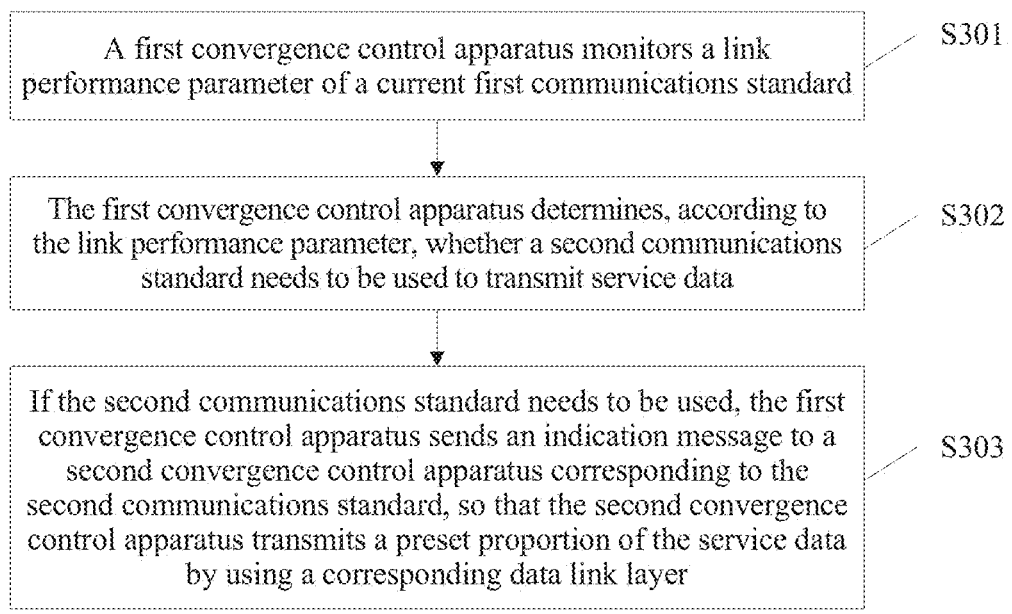
FIG. 6 is a schematic flowchart of a wireless communication method according to a third embodiment.

Referring to FIG. 5, FIG. 5 shows a network communication method according to a second embodiment. In this embodiment, the method includes.

S201. A second convergence control apparatus measures latency between a first convergence control apparatus and the second convergence control apparatus, and adjusts, according to the latency obtained after the measurement, duration of a timeout timer corresponding to the first convergence control apparatus.

Specifically, the second convergence control apparatus and the first convergence control apparatus may be connected by using a wired link, and latency exists when the first convergence control apparatus and the second convergence control apparatus exchange information. The second convergence control apparatus needs to measure the latency between the first convergence control apparatus and the second convergence control apparatus, to adjust the duration of the timeout timer. A specific measuring method may be: sending, by the second convergence control apparatus to the first convergence control apparatus, a detection message that carries a sending time; after receiving the detection message, returning, by the first convergence control apparatus to the second convergence control apparatus, a response message that carries a receiving time; receiving, by the second convergence control apparatus, the response message, and calculating a difference between the sending time and the receiving time to obtain the latency between the first convergence control apparatus and the second convergence control apparatus; and adjusting, by the second convergence control apparatus, the duration of the timeout timer between the second convergence control apparatus and the first convergence control apparatus according to the latency obtained after the calculation.

Exemplarily, a radio access node supports different communications standards, which are respectively a first communications standard, a second communications standard, and a third communications standard. The first communications standard corresponds to the first convergence control apparatus and the second communications standard corresponds to the second convergence control apparatus. The following describes a process for measuring the latency between the second convergence control apparatus and the first convergence control apparatus by the second convergence control apparatus.

The second convergence control apparatus obtains latency of 1 ms by means of calculation according to the sending time in the detection message and the receiving time in the response message returned by the first convergence control apparatus. If initial duration of the timeout timer between the second convergence control apparatus and the first convergence control apparatus is Δt ms, duration of the timeout timer that is obtained by means of adjustment according to the latency obtained after the measurement is (Δt+1) ms. In this way, in an interaction process between the second convergence control apparatus and the first convergence control apparatus, the second convergence control apparatus accurately estimates the duration of the timeout timer, avoiding unnecessary timeout retransmission. It should be noted that the second convergence control apparatus may adjust the duration of the timeout timer between the second convergence control apparatus and the first convergence control apparatus according to a preset time period to ensure accuracy of the duration of the timeout timer.

Exemplarily, the second convergence control apparatus and the first convergence control apparatus periodically exchange an explorer frame, and the explorer frame is used to detect existence of the first convergence control apparatus and the latency between the second convergence control apparatus and the first convergence control apparatus. In a usage scenario shown in FIG. 3, the second convergence control apparatus connects to the first convergence control apparatus by using a tunnel L2, and the second convergence control apparatus adjusts the duration of the timeout timer for its standard according to the latency obtained after the measurement over the tunnel L2. A format of the explorer frame is shown in the following table 1.

TABLE 1

| Destination MAC address | Source MAC address | Frame type | Frame length | Frame sequence | Load | Parity bit |
|---|---|---|---|---|---|---|

- Frame sequence → Sequence number of a frame transmitted over a tunnel L2
- Frame length → Quantity of load bits
- Frame type:
  - 00 = Sniffer frame
  - 01 = Control signaling
  - 10 = Load being service data
  - 11 = Load being a system parameter Content of the explorer frame provided in this embodiment includes: a destination MAC address, a source MAC address, a frame type, frame length, a frame sequence, load, and a parity bit.

If the frame type is set to 00, it indicates a sniffer frame, where the sniffer frame is used to measure latency over the tunnel L2; if the frame type is set to 01, it indicates control signaling; if the frame type is set to 10, it indicates that service data is stored in the load; or if the frame type is set to 11, it indicates that a system parameter of a communications standard is stored in the load.

The frame length indicates a quantity of load bits.

The frame sequence indicates a frame sequence number of the frame that is transmitted over the tunnel L2.

The parity bit is used to perform transmission error protection on data of the entire frame.

S202. After receiving an indication message sent by the first convergence control apparatus, the second convergence control apparatus obtains a preset proportion of service data from service data that the first convergence control apparatus needs to transmit.

Specifically, the second convergence control apparatus receives the indication message sent by the first convergence control apparatus, and the indication message is used to instruct the second convergence control apparatus to obtain the preset proportion of service data from the service data that the first convergence control apparatus needs to transmit. The indication message may carry a preset proportion of service data that needs to be carried by using the communications standard corresponding to the second convergence control apparatus, and the second convergence control apparatus obtains the service data according to the preset proportion.

Exemplarily, the second convergence control apparatus receives the indication message sent by the first convergence control apparatus. The indication message indicates that 50% of the service data needs to be carried by using the communications standard corresponding to the second convergence control apparatus, and the second convergence control apparatus obtains the 50% of the service data.

S203. The second convergence control apparatus performs parameter matching on the preset proportion of service data according to a system parameter of a current communications standard.

Specifically, because the communications standard corresponding to the second convergence control apparatus is different from the communications standard corresponding to the first convergence control apparatus, the second convergence control apparatus performs the parameter matching on the preset proportion of service data according to the system parameter of the current communications standard supported by the second convergence control apparatus, so that the obtained preset proportion of service data meets a requirement of the current communications standard. The parameter matching includes packet length matching, quality of service matching (including rate matching) or security matching.

The packet length matching indicates that the second convergence control apparatus assembles or disassembles a data packet of the corresponding first communications standard into a data packet that has a new length and format and that matches the supported second communications standard, where the data packet of the corresponding first communications standard comes from the first convergence control apparatus and carries the preset proportion of service data.

Exemplarily, during specific implementation, the packet length matching is divided into two situations: data sending and data receiving.

In the data sending situation, the packet length matching includes: the second convergence control apparatus obtains a to-be-transmitted first data packet from a network layer; at a data link layer, the second convergence control apparatus assembles or disassembles, according to a second system parameter of the supported second communications standard, the first data packet into several second data packets with packet lengths required by a physical layer corresponding to the second communications standard; and the second data packets are sent to the physical layer of the second communications standard by using the data link layer, and a transmitter at the physical layer completes sending of the second data packets.

In the data receiving situation, the packet length matching includes: the second convergence control apparatus receives a third data packet from a radio channel at a physical layer; at a data link layer, the second convergence control apparatus assembles or disassembles, according to a second system parameter of the second communications standard, the third data packet into several fourth data packets with packet lengths required by a network layer corresponding to the second communications standard; and the fourth data packets are sent to the network layer by using the data link layer.

The quality of service QoS matching indicates that the second convergence control apparatus obtains a service quality requirement parameter of the first communications standard of the first convergence control apparatus that sends the indication message; and the second convergence control apparatus transmits the preset proportion of service data according to the service quality requirement parameter of the first communications standard. The service quality requirement parameter includes but is not limited to a rate, latency or jitter.

Exemplarily, it has been learned that different QoS levels are defined for different communications standards respectively. For example, eight QoS levels defined for an LTE communications standard of the 3rd Generation Partnership Project (3GPP) gradually decrease in priority from Level 0 to Level 7. Four QoS levels defined for a WLAN communications standard gradually decrease in priority from Voice (AC0) to Video (AC1) to Best Effort (AC2) to priority Background (AC3).

The QoS matching includes: implementing, by a network owner or a network operator, definition of a mapping relationship between the different QoS levels of the different communications standards. For example, Level 0 and Level 1 in the 3GPP approximately equal to Voice (AC0) in the WLAN.

More specifically, the rate matching in the foregoing QoS matching indicates that the second convergence control apparatus obtains a required data rate and an actual data rate of the first communications standard supported by the first convergence control apparatus that sends the indication message; and the second convergence control apparatus provides, according to a bearer capability of the supported second communications standard, a user with a rate that is close to the required data rate of the first communications standard.

The security matching indicates that the second convergence control apparatus obtains a security level of the first communications standard supported by the first convergence control apparatus that sends the indication message; and the second convergence control apparatus provides a user with a security level service of the first communications standard and provides feedback for the first convergence control apparatus. If a security level at which the second convergence control apparatus provides a user with a service cannot reach the security level required by the first communications standard, the second convergence control apparatus is not used to provide the user with the service.

S204. The second convergence control apparatus transmits the matched preset proportion of service data by using a corresponding data link layer.

Specifically, after performing, at the corresponding data link layer, packet assembly and disassembly, rate adaptation, and transmission channel allocation on the data, the second convergence control apparatus transmits the data to a physical layer or a network layer, and then transmits the data by using the physical layer or the network layer.

Further, optionally, the second convergence control apparatus returns, to the first convergence control apparatus, a result of transmitting the foregoing preset proportion of service data. For example, the second convergence control apparatus returns a transmission success message or a transmission failure message to the first convergence control apparatus to notify the first convergence control apparatus of the result of transmitting the data.

It may be learned from the foregoing implementation manners that a control function of a convergence control apparatus is located at a data link layer, not at an IP layer, so that a dynamic response to a link status is more sensitive, and a decision of switching between different standards can be made faster.

In addition, it may be learned from the foregoing implementation manners that, in a data exchange process, a data storage area is included at a data link layer, and processing does not need to be performed at an IP layer. Therefore, a process such as IP session reestablishment, IP rerouting, diverted IP sending or IP header re-resolution is not required. Therefore, after the implementation manner is used, a performance jitter time of service data is shorter. In other words, a process for wireless communication switching between different standards can be faster.

In addition, in this embodiment, an operation manner of distributed convergence control apparatuses is used, and a convergence control apparatus is disposed at each data link layer, so that the convergence control apparatus is prevented from being a performance bottleneck when a system scale is large, diversification of decision algorithms can be supported, and scalability is high.

Referring to FIG. 4, FIG. 4 is a schematic flowchart of a network communication method according to a third embodiment. In this embodiment, the method includes:

S301. A first convergence control apparatus monitors a link performance parameter of a current first communications standard.

Specifically, the first convergence control apparatus is disposed at a data link layer, and the data link layer supports one communications standard. The first convergence control apparatus monitors the link performance parameter of the communications standard supported by the data link layer at which the first convergence control apparatus is located.

S302. The first convergence control apparatus determines, according to the link performance parameter, whether a second communications standard needs to be used to transmit service data.

Specifically, the first convergence control apparatus determines, according to the link performance parameter of the current first communications standard, whether transmission load of the first communications standard exceeds a preset value. If the transmission load of the first communications standard exceeds the preset value, the first convergence control apparatus needs to select the second communications standard to transmit the service data to relieve the transmission load of the current first communications standard, to avoid timeout or packet loss caused by a failure in dealing with the service data in time by using the current first communications standard.

It should be noted that the second communications standard in this embodiment includes at least one of other communications standards except the first communications standard. For example, if the first communications standard is a wireless cellular network communications standard, the selected second communications standard is a WiFi communications standard and/or a WiMAX communications standard.

S303. If the second communications standard needs to be used, the first convergence control apparatus sends an indication message to a second convergence control apparatus corresponding to the second communications standard, so that the second convergence control apparatus transmits a preset proportion of the service data by using a corresponding data link layer.

Specifically, the first convergence control apparatus sends the indication message to the selected second convergence control apparatus, where the indication message is used to instruct the second convergence control apparatus to transmit the preset proportion of service data by using the corresponding data link layer. That is, a part of the service data is carried by using the second communications standard corresponding to the second convergence control apparatus, and the first convergence control apparatus transmits the remaining part of the service data. It should be noted that a proportion of the service data transmitted by the first convergence control apparatus may be zero, that is, all of the service data is carried by using the second communications standard.

During implementation of this embodiment, a first convergence control apparatus determines, by monitoring a link performance parameter of a current communications standard, whether another communications standard is required to transmit service data; and if the another communications standard is required to transmit the service data, an indication is provided for carrying a part or all of the service data by using the another communications standard. Therefore, different communications standards can be used to provide a service for a user, so that a temporary service flow interruption of a user terminal can be avoided, consistency of user experience is ensured, and overall efficiency of a communications system is improved.

Figure 7:
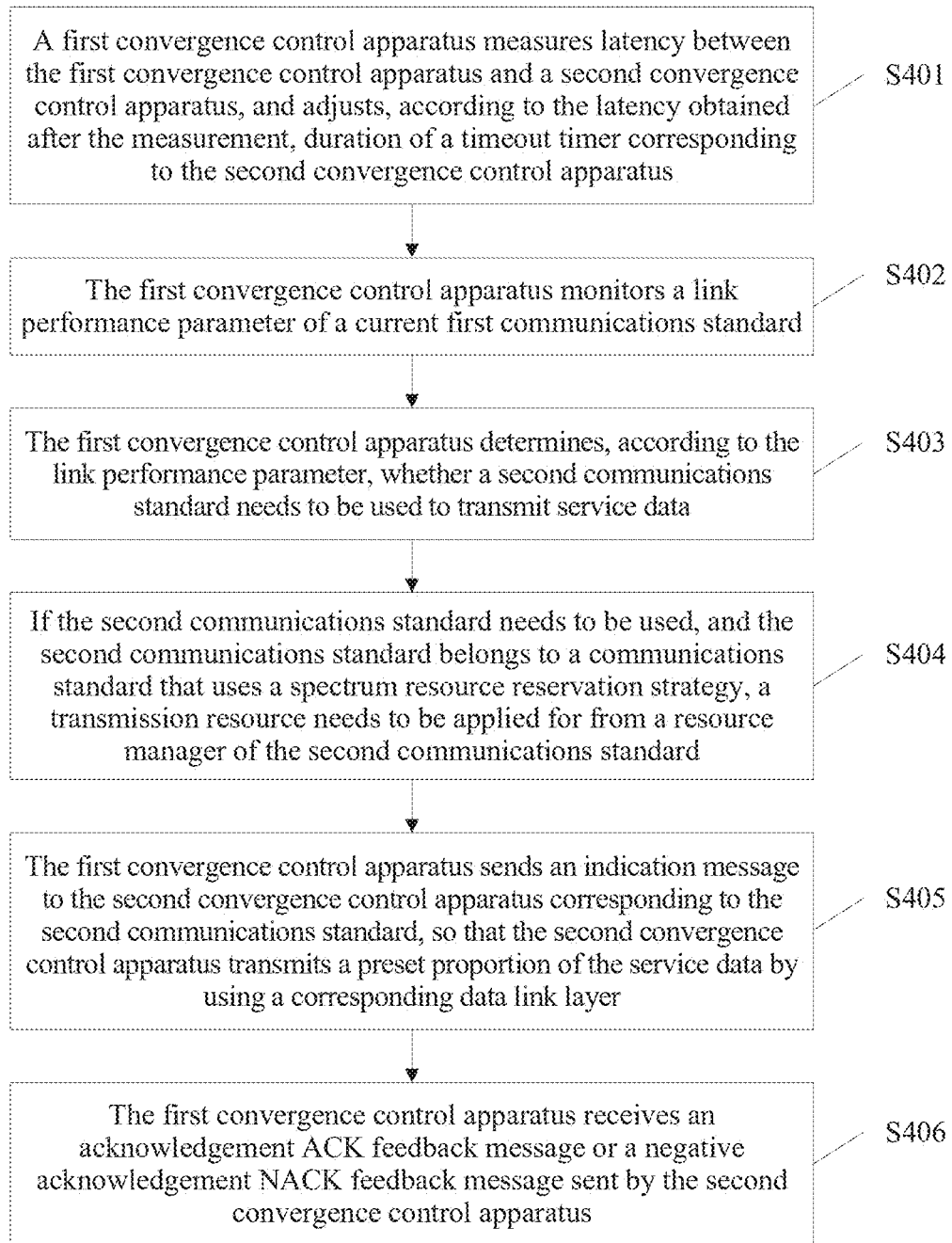
FIG. 7 is a schematic flowchart of a wireless communication method according to a fourth embodiment.

To make a person skilled in the art more clearly understand the technical solutions provided in the embodiments, the following describes in detail, by using specific embodiments, a network communication method according to an embodiment. As shown in FIG. 7, in this embodiment, the method includes.

S401. A first convergence control apparatus measures latency between the first convergence control apparatus and a second convergence control apparatus, and adjusts, according to the latency obtained after the measurement, duration of a timeout timer corresponding to the second convergence control apparatus.

Specifically, the first convergence control apparatus and the second convergence control apparatus may be connected by using a wired link, and latency exists when the first convergence control apparatus and the second convergence control apparatus exchange information. The first convergence control apparatus needs to measure the latency between the first convergence control apparatus and the second convergence control apparatus, to adjust the duration of the timeout timer of the first convergence control apparatus. A specific measuring method may be: sending, by the first convergence control apparatus to the second convergence control apparatus, a detection message that carries a sending time; after receiving the detection message, obtaining, by the second convergence control apparatus, a receiving time and returning, to the first convergence control apparatus, a response message that carries the receiving time; and obtaining, by the first convergence control apparatus, the latency between the first convergence control apparatus and the second convergence control apparatus by means of calculation according to the sending time and the receiving time, and adjusting the duration of the timeout timer between the first convergence control apparatus and the second convergence control apparatus according to the latency obtained by means of calculation.

It should be noted that the second convergence control apparatus in this embodiment refers to, in general, at least one convergence control apparatus except the first convergence control apparatus, and each convergence control apparatus supports one communications standard.

Exemplarily, a radio access node supports different communications standards, which are respectively a first communications standard and a second communications standard. The first communications standard corresponds to the first convergence control apparatus and the second communications standard corresponds to the second convergence control apparatus. The following describes a process for measuring the latency between the first convergence control apparatus and the second convergence control apparatus by the first convergence control apparatus.

The first convergence control apparatus obtains latency of 0.5 ms by means of calculation according to the sending time in the detection message and the receiving time in the response message returned by the second convergence control apparatus. If initial duration of the timeout timer between the first convergence control apparatus and the second convergence control apparatus is initially $\Delta t$ ms, duration of the timeout timer that is obtained by means of adjustment according to the latency obtained after the measurement is $(\Delta t+0.5)$ ms. In this way, in an interaction process between the first convergence control apparatus and the second convergence control apparatus, the first convergence control apparatus accurately estimates the duration of the timeout timer, avoiding unnecessary timeout retransmission. It should be noted that the first convergence control apparatus may adjust the duration of the timeout timer between the first convergence control apparatus and the second convergence control apparatus according to a preset time period to ensure accuracy of the duration of the timeout timer.

S402. The first convergence control apparatus monitors a link performance parameter of a current first communications standard.

Specifically, the first convergence control apparatus is disposed at a data link layer, and the first communications standard supported by the data link layer includes any one communications standard of a wireless cellular network, a WLAN, WiMAX, Bluetooth or infrared. The first convergence control apparatus monitors the link performance parameter of the first communications standard supported by the data link layer at which the first convergence control apparatus is located.

Exemplarily, the first communications standard supported by the data link layer at which the first convergence control apparatus is located is an LTE communications standard, and the first convergence control apparatus monitors a link performance parameter of the LTE communications standard. The link performance parameter may include one of or a combination of a throughput, a cache queue length, and a quantity of on-line authenticated users.

S403. The first convergence control apparatus determines, according to the link performance parameter, whether a second communications standard needs to be used to transmit service data.

Specifically, the first convergence control apparatus compares, with a corresponding preset threshold, the throughput, the cache queue length, or the quantity of the on-line authenticated users of the first communications standard supported by the data link layer at which the first convergence control apparatus is located. If the throughput, the cache queue length, or the quantity of the on-line authenticated users is greater than the corresponding preset threshold, it is determined that the second communications standard needs to be used to transmit the service data.

It should be noted that the second communications standard in this embodiment includes at least one communications standard except the first communications standard, and each communications standard corresponds to one convergence control apparatus. In this embodiment, these convergence control apparatuses are collectively referred to as the second convergence control apparatus.

Exemplarily, the first communications standard is an LTE communications standard. The first convergence control apparatus compares a throughput, a cache queue length, or a quantity of on-line authenticated users of the current LTE communications standard with a preset threshold. If the throughput, the cache queue length, or the quantity of the on-line authenticated users of the current LTE communications standard is greater than the preset threshold, it is determined that the second communications standard needs to be used to transmit a part or all of the service data. For example, if the first convergence control apparatus monitors that the cache queue length of the current LTE communications standard is 110, greater than a preset threshold 100, it may be determined that the LTE communications standard is overloaded, and that the service data cannot be transmitted to a user terminal or a network layer device in time. Therefore, the second communications standard needs to be selected to transmit the service data.

S404. If the second communications standard needs to be used, and the second communications standard belongs to a communications standard that uses a spectrum resource reservation strategy, a transmission resource needs to be applied for from a resource manager of the second communications standard.

Specifically, a feature of a communications standard that uses the spectrum resource reservation strategy is that all transmission resources (uplink and downlink) of the communications standard are uniformly managed and allocated by a network-side resource manager, and the communications standard can be used for transmission only after a transmission resource is obtained by means of application. The communications standard that uses the spectrum resource reservation strategy includes a wireless cellular network communications standard and a WiMAX communications standard.

Exemplarily, it is assumed that the first convergence control apparatus determines that the selected second communications standard includes an LTE communications standard. Because the LTE communications standard belongs to the communications standard that uses the spectrum resource reservation strategy, the first convergence control apparatus needs to apply for a transmission resource from a resource manager of the LTE communications standard. After the transmission resource is obtained by means of application, the first convergence control apparatus can transmit the service data by using the obtained transmission resource.

S405. The first convergence control apparatus sends an indication message to the second convergence control apparatus corresponding to the second communications standard, so that the second convergence control apparatus transmits a corresponding preset proportion of the service data by using a corresponding data link layer.

Specifically, the first convergence control apparatus sends the indication message to the second convergence control apparatus corresponding to the selected second communications standard, so that, after receiving the indication message, the second convergence control apparatus transmits the corresponding preset proportion of the service data by using the corresponding data link layer.

Exemplarily, if the first communications standard supported by the data link layer at which the first convergence control apparatus is located is an LTE communications standard, and the second communications standard selected by the first convergence control apparatus is a WiFi communications standard, the first convergence control apparatus sends an indication message to a second convergence control apparatus corresponding to the WiFi communications standard, to instruct the second convergence control apparatus to transmit 50% of the service data. Alternatively, if second communications standards selected by the first convergence control apparatus are a WiFi communications standard and a WiMAX communications standard, the first convergence control apparatus sends an indication message to a second convergence control apparatus corresponding to the WiFi communications standard and an indication message to a second convergence control apparatus corresponding to the WiMAX communications standard, to respectively instruct the WiFi communications standard to transmit 50% of the service data and the WiMAX communications standard to transmit 30% of the service data. It may be understood that, in this embodiment, a total proportion of the service data carried by using other communications standards ranges from 0 to 100%. It should be noted that, in the description of this embodiment, transmitting the service data by using the data link layer specifically refers to transmitting the service data by means of collaboration of a network layer, a data link layer, and a physical layer in a communications standard.

S406. The first convergence control apparatus receives an acknowledgement (ACK) feedback message or a negative acknowledgement (NACK) feedback message sent by the second convergence control apparatus.

Specifically, the acknowledgement feedback message is a message sent by the second convergence control apparatus after confirming correct transmission of the preset proportion of the service data, and the negative acknowledgement feedback message is a message sent by the second convergence control apparatus after confirming incorrect transmission of the preset proportion of the service data.

Exemplarily, a network side on which the second convergence control apparatus is located sends data to a user terminal. After correctly receiving the data, the user terminal sends an ACK feedback message to the second convergence control apparatus, so that the second convergence control apparatus confirms that the data is successfully sent; and the second convergence control apparatus returns the acknowledgement feedback message to the first convergence control apparatus. Alternatively, after incorrectly receiving the data, the user terminal sends a NACK feedback message to the second convergence control apparatus, so that the second convergence control apparatus confirms that the data is not successfully sent, and the data link layer and the physical layer need to be instructed to resend the data to the user terminal; and the second convergence control apparatus returns the negative acknowledgement feedback message to the first convergence control apparatus. If the first convergence control apparatus receives neither the ACK nor the NACK within a preset period, timeout (Timeout) is considered, and a data link layer and a physical layer of a target convergence control unit need to be instructed to resend the data to the user terminal.

Optionally, the first convergence control apparatus determines whether a to-be-transmitted data packet is already transmitted by the second convergence control apparatus. If the to-be-transmitted data packet is already transmitted by the second convergence control apparatus, the to-be-transmitted data packet is discarded. A determining method may be determining, by using a packet sequence number of the to-be-transmitted data packet, whether the to-be-transmitted data packet is already transmitted by the second convergence control apparatus.

During implementation of this embodiment, a first convergence control apparatus determines, by monitoring a link performance parameter of a current communications standard, whether another communications standard is required to transmit service data; and if the another communications standard is required to transmit the service data, an indication is provided for carrying a part or all of the service data by using the another communications standard. Therefore, different communications standards can be used to provide a service for a user, so that a temporary service flow interruption of a user terminal can be avoided, consistency of user experience is ensured, and overall efficiency of a communications system is improved. In addition, a convergence control apparatus is disposed at each data link layer, so that the convergence control apparatus is prevented from being a performance bottleneck when a system scale is large, diversification of decision algorithms can be supported, and scalability is high.

Figure 8:
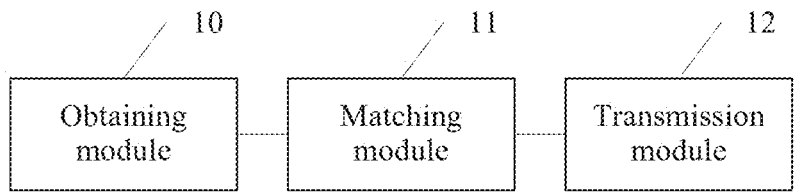
FIG. 8 is a schematic structural diagram of a convergence control apparatus according to a first embodiment.

Referring to FIG. 8, FIG. 8 is a schematic structural diagram of a convergence control apparatus according to a first embodiment. In this embodiment, the convergence control apparatus includes an obtaining module 10, a matching module 11, and a transmission module 12.

The obtaining module 10 is configured to obtain, after receiving an indication message sent by a first convergence control apparatus, a preset proportion of service data from service data that the first convergence control apparatus needs to transmit.

The matching module 11 is configured to perform parameter matching on the preset proportion of service data according to a system parameter of a current communications standard.

The transmission module 12 is configured to transmit the matched preset proportion of service data by using a corresponding data link layer.

This embodiment and the first method embodiment are based on a same conception, and technical effects brought by this embodiment and the first method embodiment are also the same. Reference may be made to descriptions of the first method embodiment, and details are not described herein.

Figure 9:
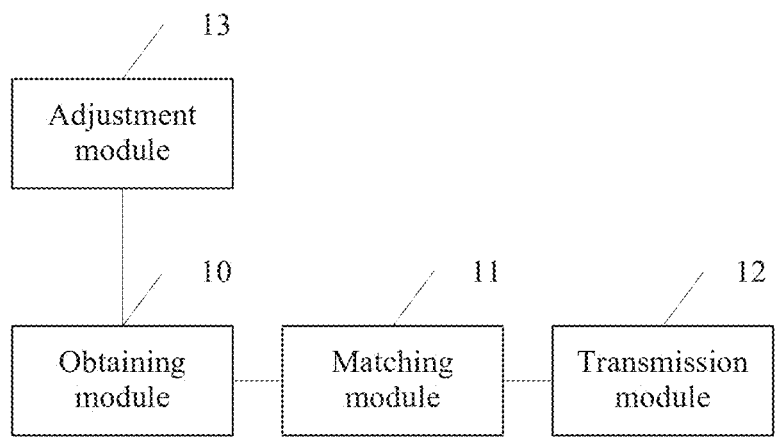
FIG. 9 is a schematic structural diagram of a convergence control apparatus according to a second embodiment.
Figure 10:
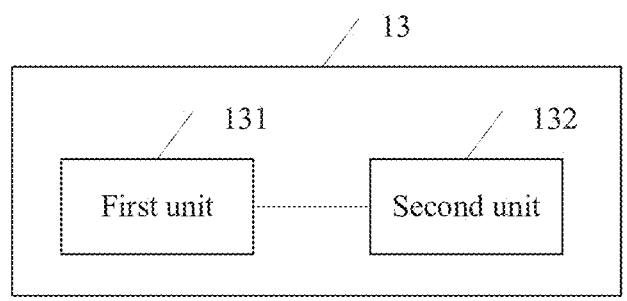
FIG. 10 is a schematic structural diagram of an adjustment module in FIG. 9.

Referring to FIG. 9 and FIG. 10, FIG. 9 and FIG. 10 are schematic structural diagrams of a convergence control apparatus according to a second embodiment. In this embodiment, in addition to an obtaining module 10, a matching module 11, and a transmission module 12, the convergence control apparatus further includes an adjustment module 13.

The adjustment module 13 is configured to measure latency between the convergence control apparatus and a first convergence control apparatus, and adjust, according to the latency obtained after the measurement, duration of a timeout timer corresponding to the first convergence control apparatus.

Optionally, the adjustment module 13 includes a first unit 131 and a second unit 132.

The first unit 131 is configured to send, to the first convergence control apparatus, a detection message that carries a sending time, so that the first convergence control apparatus returns, after receiving the detection message, a response message that carries a receiving time.

The second unit 132 is configured to calculate the latency between the convergence control apparatus and the first convergence control apparatus according to the sending time and the receiving time.

Optionally, the matching module 11 is specifically configured to perform rate matching, packet length matching, quality of service matching or security matching on a preset proportion of service data according to a system parameter of a current communications standard.

This embodiment and the second method embodiment are based on a same conception, and technical effects brought by this embodiment and the second method embodiment are also the same. Reference may be made to descriptions of the second method embodiment, and details are not described herein.

Figure 11:
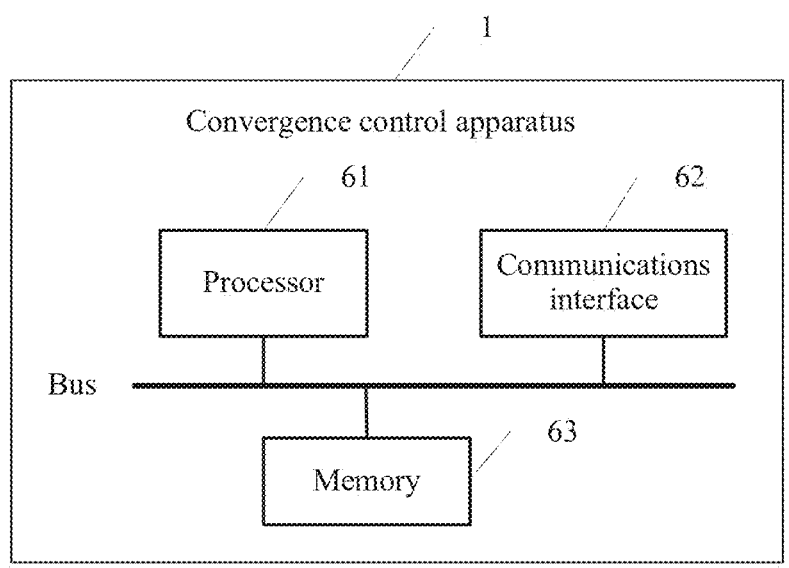
FIG. 11 is a schematic structural diagram of a convergence control apparatus according to a third embodiment.

Referring to FIG. 11, FIG. 11 is a schematic structural diagram of a convergence control apparatus according to a third embodiment. In this embodiment, the convergence control apparatus includes a processor 61, a memory 62, and a communications interface 63. The communications interface 63 is configured to communicate with an external device. One or more processors 61 may exist in the convergence control apparatus, and one processor is used as an example in FIG. 11. In some embodiments, the processor 61, the memory 62, and the communications interface 63 may be connected by using a bus or in another manner, and a bus connection is used as an example in FIG. 11.

The memory 62 stores a group of program code, and the processor 61 is configured to invoke the program code stored in the memory 62 to perform the following operations: obtaining, after receiving an indication message sent by a first convergence control apparatus, a preset proportion of service data from service data that the first convergence control apparatus needs to transmit; performing parameter matching on the preset proportion of service data according to a system parameter of a current communications standard; and transmitting the matched preset proportion of service data by using a corresponding data link layer.

In some embodiments, before executing the obtaining, after receiving an indication message sent by a first convergence control apparatus, a preset proportion of service data from service data that the first convergence control apparatus needs to transmit, the processor 61 is further configured to perform: measuring, latency between the convergence control apparatus and the first convergence control apparatus, and adjusting, according to the latency obtained after the measurement, duration of a timeout timer corresponding to the first convergence control apparatus.

In some embodiments, that the processor 61 executes the measuring latency between the convergence control apparatus and the first convergence control apparatus includes:

sending, to the first convergence control apparatus, a detection message that carries a sending time, so that the first convergence control apparatus returns, after receiving the detection message, a response message that carries a receiving time; and calculating the latency between the convergence control apparatus and the first convergence control apparatus according to the sending time and the receiving time.

In some embodiments, that the processor 61 executes the performing parameter matching on the preset proportion of service data according to a system parameter of a current communications standard includes: performing rate matching, packet length matching, quality of service matching or security matching on the preset proportion of service data according to the system parameter of the current communications standard.

Figure 12:
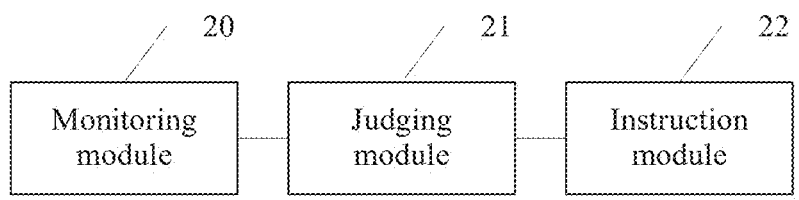
FIG. 12 is a schematic structural diagram of a convergence control apparatus according to a fourth embodiment.

Referring to FIG. 12, FIG. 12 is a schematic structural diagram of a convergence control apparatus according to a fourth embodiment. In this embodiment, the convergence control apparatus includes a monitoring module 20, a judging module 21, and an instruction module 22.

The monitoring module 20 is configured to monitor a link performance parameter of a current first communications standard.

The judging module 21 is configured to determine, according to the link performance parameter, whether a second communications standard needs to be used to transmit service data.

The instruction module 22 is configured to: if the second communications standard needs to be used, send an indication message to a second convergence control apparatus corresponding to the second communications standard, so that the second convergence control apparatus transmits a preset proportion of the service data by using a corresponding data link layer.

This embodiment and the third method embodiment are based on a same conception, and technical effects brought by this embodiment and the third method embodiment are also the same. Reference may be made to descriptions of the third method embodiment, and details are not described herein.

Figure 13:
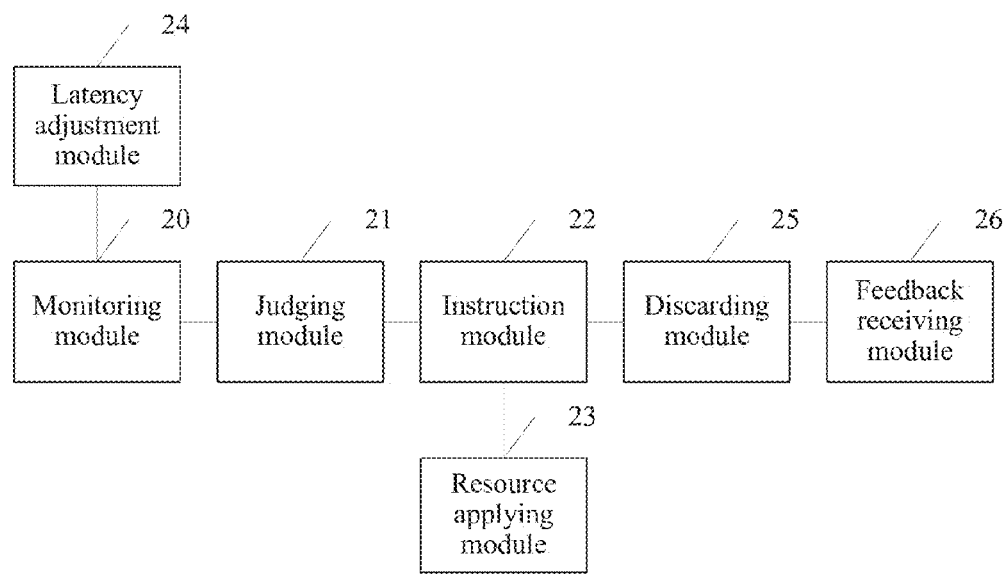
FIG. 13 is a schematic structural diagram of a convergence control apparatus according to a fifth embodiment.
Figure 14:
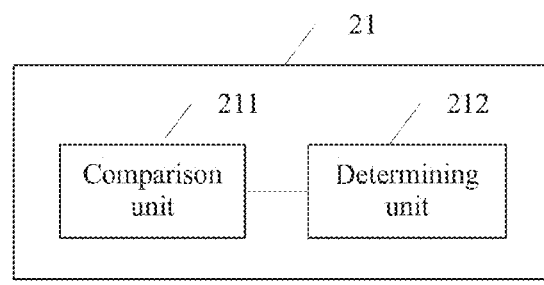
FIG. 14 is a schematic structural diagram of a judging module in FIG. 13.
Figure 15:
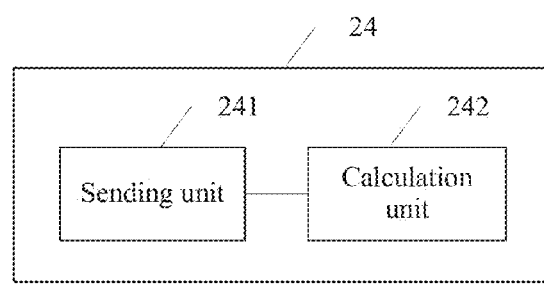
FIG. 15 is a schematic structural diagram of a latency adjustment module in FIG. 13.

Referring to FIG. 13 to FIG. 15, FIG. 13 to FIG. 15 are schematic structural diagrams of a convergence control apparatus according to a fifth embodiment. In this embodiment 0, in addition to a monitoring module 20, a judging module 21, and an instruction module 22, the convergence control apparatus further includes a resource applying module 23, a latency adjustment module 24, a discarding module 25, and a feedback receiving module 26.

The resource applying module 23 is configured to: if the second communications standard belongs to a communications standard that uses a spectrum resource reservation strategy, apply for a transmission resource from a resource manager of the second communications standard, where the communications standard that uses the spectrum resource reservation strategy includes a wireless cellular network and WiMAX.

The latency adjustment module 24 is configured to measure latency between the convergence control apparatus and the second convergence control apparatus, and adjust, according to the latency obtained after the measurement, duration of a timeout timer corresponding to the second convergence control apparatus.

The discarding module 25 is configured to: if the convergence control apparatus determines that a to-be-transmitted data packet is already transmitted by using the second communications standard, discard the to-be-transmitted data packet.

The feedback receiving module 26 is configured to receive an ACK feedback message or a NACK feedback message sent by the second convergence control apparatus, where the acknowledgement feedback message is a message sent by the second convergence control apparatus after confirming correct transmission of the preset proportion of the service data, and the negative acknowledgement feedback message is a message sent by the second convergence control apparatus after confirming incorrect transmission of the preset proportion of the service data.

Optionally, the monitoring module 20 is specifically configured to monitor a throughput, a cache queue length, or a quantity of on-line authenticated users of a current first communications standard.

Optionally, the judging module 21 includes a comparison unit 211 and a determining unit 212.

The comparison unit 211 is configured to compare the throughput, the cache queue length or the quantity of the on-line authenticated users of the first communications standard with a corresponding preset threshold.

The determining unit 212 is configured to: if the throughput, the cache queue length or the quantity of the on-line authenticated users is greater than the corresponding preset threshold, determine that the second communications standard needs to be used to transmit the service data.

Optionally, the latency adjustment module 24 includes a sending unit 241 and a calculation unit 242.

The sending unit 241 is configured to send, to the second convergence control apparatus, a detection message that carries a sending time, so that the second convergence control apparatus returns, after receiving the detection message, a response message that carries a receiving time.

The calculation unit 242 is configured to calculate the latency between the convergence control apparatus and the second convergence control apparatus according to the sending time and the receiving time.

This embodiment and the fourth method embodiment are based on a same conception, and technical effects brought by this embodiment and the fourth method embodiment are also the same. Reference may be made to descriptions of the fourth method embodiment, and details are not described herein.

Figure 16:
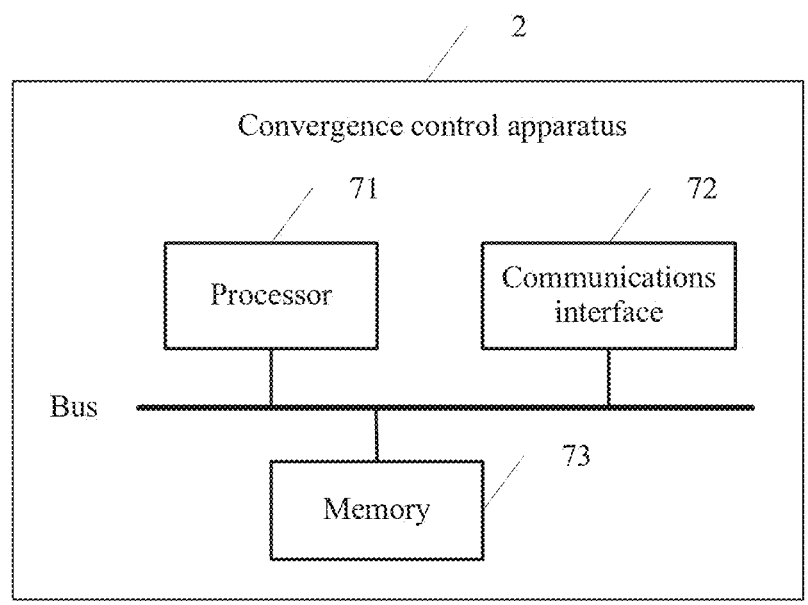
FIG. 16 is a schematic structural diagram of a convergence control apparatus according to a sixth embodiment.

Referring to FIG. 16, FIG. 16 is a schematic structural diagram of a convergence control apparatus according to a sixth embodiment. In this embodiment, the convergence control apparatus includes a processor 71, a memory 72, and a communications interface 73. The communications interface 73 is configured to communicate with an external device. One or more processors 71 may exist in the convergence control apparatus, and one processor is used as an example in FIG. 16. In some embodiments, the processor 71, the memory 72, and the communications interface 73 may be connected by using a bus or in another manner, and a bus connection is used as an example in FIG. 16.

The memory 72 stores a group of program code, and the processor 71 is configured to invoke the program code stored in the memory 72 to perform the following operations: monitoring a link performance parameter of a current first communications standard; determining, according to the link performance parameter, whether a second communications standard needs to be used to transmit service data; and if the second communications standard needs to be used, sending an indication message to a second convergence control apparatus corresponding to the second communications standard, so that the second convergence control apparatus transmits a preset proportion of the service data by using a corresponding data link layer.

In some embodiments, before executing the sending an indication message to a second convergence control apparatus corresponding to the second communications standard, the processor 71 is further configured to perform: if the second communications standard belongs to a communications standard that uses a spectrum resource reservation strategy, applying for a transmission resource from a resource manager of the second communications standard, where the communications standard that uses the spectrum resource reservation strategy includes a wireless cellular network and WiMAX.

In some embodiments, that the processor 71 executes the monitoring a link performance parameter of a current first communications standard includes: monitoring a throughput, a cache queue length, or a quantity of on-line authenticated users of the current first communications.

In some embodiments, that the processor 71 executes the determining, according to the link performance parameter, whether a second communications standard needs to be used to transmit service data includes: comparing the throughput, the cache queue length or the quantity of the on-line authenticated users of the first communications standard with a corresponding preset threshold; and if the throughput, the cache queue length or the quantity of the on-line authenticated users is greater than the corresponding preset threshold, determining that the second communications standard needs to be used to transmit the service data.

In some embodiments, the processor 71 is further configured to perform: measuring latency between the convergence control apparatus and the second convergence control apparatus, and adjusting, according to the latency obtained after the measurement, duration of a timeout timer corresponding to the second convergence control apparatus.

In some embodiments, that the processor 71 executes the measuring latency between the convergence control apparatus and the second convergence control apparatus includes: sending, to the second convergence control apparatus, a detection message that carries a sending time, so that the second convergence control apparatus returns, after receiving the detection message, a response message that carries a receiving time; and calculating, the latency between the convergence control apparatus and the second convergence control apparatus according to the sending time and the receiving time.

In some embodiments, the processor 71 is further configured to perform: if the convergence control apparatus determines that a to-be-transmitted data packet is already transmitted by using the second communications standard, discarding the to-be-transmitted data packet.

In some embodiments, the processor 71 is further configured to perform: receiving an ACK feedback message or a NACK feedback message sent by the second convergence control apparatus, where the acknowledgement feedback message is a message sent by the second convergence control apparatus after confirming correct transmission of the preset proportion of the service data, and the negative acknowledgement feedback message is a message sent by the second convergence control apparatus after confirming incorrect transmission of the preset proportion of the service data.

During implementation of this embodiment, a convergence control apparatus determines, by monitoring a link performance parameter of a current communications standard, whether another communications standard is required to transmit service data; and if the another communications standard is required to transmit the service data, an indication is provided for carrying a part or all of the service data by using the another communications standard. Therefore, different communications standards can be used to provide a service for a user, so that a temporary service flow interruption of a user terminal can be avoided, consistency of user experience is ensured, and overall efficiency of a communications system is improved.

Finally, in the technical solutions provided in the foregoing embodiments, a wireless cellular network standard and a WLAN standard are used only as examples. The solutions provided in the embodiments support communications standards such as a wireless cellular network standard, a WLAN standard, a WiMAX standard, Bluetooth, and infrared. Based on the technical solutions provided in the embodiments, a person skilled in the art may implement switching between networks of the foregoing communications standards without creative efforts.

In the several embodiments provided in the present embodiments, it should be understood that the disclosed apparatus and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments. The foregoing storage medium includes: any medium that can store program code, such as an universal serial bus (USB) flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions, but not for limiting the present embodiments. Although the present embodiments are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments.

What is claimed is:

1. A method, comprising:
    receiving, by a second convergence control apparatus, an indication message sent by a first convergence control apparatus, the indication message comprising a value of a preset proportion of service data that the first convergence control apparatus has to transmit;
    in response to receiving the indication message, obtaining, by the second convergence control apparatus, the preset proportion of the service data;
    performing, by the second convergence control apparatus, parameter matching on the preset proportion of service data according to a system parameter of a current communications standard; and
    transmitting, by the second convergence control apparatus, the matched preset proportion of service data using a corresponding data link layer.

2. The method according to claim 1, further comprising:
    measuring, by the second convergence control apparatus, latency between the first convergence control apparatus and the second convergence control apparatus, before obtaining the preset proportion of service data; and
    adjusting, according to the latency, a duration of a timeout timer corresponding to the first convergence control apparatus.

3. The method according to claim 2, wherein measuring the latency between the first convergence control apparatus and the second convergence control apparatus comprises:
    sending, by the second convergence control apparatus to the first convergence control apparatus, a detection message that carries a sending time, the detection message requesting that the first convergence control apparatus return a response message that carries a receiving time; and
    calculating, by the second convergence control apparatus, the latency between the first convergence control apparatus and the second convergence control apparatus according to the sending time and the receiving time.

4. The method according to claim 1, wherein performing parameter matching on the preset proportion of service data comprises:
    performing, by the second convergence control apparatus, rate matching, packet length matching, quality of service matching, or security matching on the preset proportion of service data according to the system parameter of the current communications standard.

5. A method, comprising:
    monitoring, by a first convergence control apparatus, a link performance parameter of a current first communications standard;
    determining, by the first convergence control apparatus according to the link performance parameter, whether a second communications standard will be used to transmit service data; and
    sending, by the first convergence control apparatus, an indication message to a second convergence control apparatus corresponding to the second communications standard, requesting that the second convergence control apparatus transmit a preset proportion of the service data using a corresponding data link layer, in response to determining that the second communications standard will be used.

6. The method according to claim 5, further comprising:
    applying for a transmission resource from a resource manager of the second communications standard, in response to the second communications standard belonging to a communications standard that uses a spectrum resource reservation strategy and before sending the indication message to the second convergence control apparatus corresponding to the second communications standard, wherein the communications standard that uses the spectrum resource reservation strategy comprises a wireless cellular network and Worldwide Interoperability for Microwave Access (WiMAX).

7. The method according to claim 5, wherein monitoring the link performance parameter of a current first communications standard comprises:
    monitoring, by the first convergence control apparatus, a characteristic selected from the group consisting of a throughput, a cache queue length, and a quantity of on-line authenticated users of the current first communications standard.

8. The method according to claim 7, wherein determining whether the second communications standard will be used to transmit service data comprises:
    comparing the characteristic with a corresponding preset threshold; and
    determining that the second communications standard will be used to transmit the service data in response to the characteristic being greater than the corresponding preset threshold.

9. The method according to claim 5, wherein the method further comprises:
    measuring, by the first convergence control apparatus, latency between the first convergence control apparatus and the second convergence control apparatus; and
    adjusting, according to the latency, a duration of a timeout timer corresponding to the second convergence control apparatus.

10. The method according to claim 9, wherein measuring latency between the first convergence control apparatus and the second convergence control apparatus comprises:
    sending, by the first convergence control apparatus to the second convergence control apparatus, a detection message that carries a sending time, the detection message requesting that the second convergence control apparatus return a response message that carries a receiving time;
    receiving, by the first convergence control apparatus, the response message; and
    calculating, by the first convergence control apparatus, the latency between the first convergence control apparatus and the second convergence control apparatus according to the sending time and the receiving time.

11. The method according to claim 5, further comprising: discarding a to-be-transmitted data packet in response to the first convergence control apparatus determining that the to-be-transmitted data packet is already transmitted using the second communications standard.

12. The method according to claim 5, further comprising: receiving, by the first convergence control apparatus, an acknowledgement feedback message or a negative acknowledgement feedback message sent by the second convergence control apparatus, wherein the acknowledgement feedback message is a message sent by the second convergence control apparatus after confirming correct transmission of the preset proportion of the service data, and the negative acknowledgement feedback message is a message sent by the second convergence control apparatus after confirming incorrect transmission of the preset proportion of the service data.

13. An apparatus, comprising:
a processor; and
a non-transitory computer readable storage medium storing a program for execution by the processor, the program including instructions to:
  receive an indication message sent by a first convergence control apparatus, the indication message comprising a value of a preset proportion of service data that the first convergence control apparatus has to transmit;
  in response to receiving the indication message, obtain the preset proportion of the service data;
  perform parameter matching on the preset proportion of service data according to a system parameter of a current communications standard; and
  transmit the matched preset proportion of service data using a corresponding data link layer.

14. The apparatus according to claim 13, wherein the instructions further comprise instructions to:
  measure a latency between the apparatus and the first convergence control apparatus; and
  adjust, according to the latency, duration of a timeout corresponding to the first convergence control apparatus.

15. The apparatus according to claim 14, wherein the instructions to adjust the duration of the timeout comprise instructions to:
  send, to the first convergence control apparatus, a detection message that carries a sending time, the detection message instructing the first convergence control apparatus to return, after receiving the detection message, a response message that carries a receiving time; and
  calculate the latency between the apparatus and the first convergence control apparatus according to the sending time and the receiving time.

16. The apparatus according to claim 13, wherein the instructions to perform parameter matching comprise instructions to perform rate matching, packet length matching, quality of service matching, or security matching on the preset proportion of service data according to the system parameter of the current communications standard.

17. An apparatus, comprising:
a processor; and
a non-transitory computer readable storage medium storing a program for execution by the processor, the program including instructions to:
  monitor a link performance parameter of a current first communications standard;
  determine, according to the link performance parameter, whether a second communications standard will be used to transmit service data; and
  send an indication message to a second convergence control apparatus corresponding to the second communications standard, requesting that the second convergence control apparatus transmits a preset proportion of the service data using a corresponding data link layer, in response to determining that the second communications standard will be used.

18. The apparatus according to claim 17, wherein the instructions further comprise instructions to:
  apply for a transmission resource from a resource manager of the second communications standard, in response to the second communications standard belonging to a communications standard that uses a spectrum resource reservation strategy, wherein the communications standard that uses the spectrum resource reservation strategy comprises a wireless cellular network and Worldwide Interoperability for Microwave Access (WiMAX).

19. The apparatus according to claim 17, wherein the instructions to monitor the link performance parameter comprise instructions to monitor a characteristic selected from the group consisting of a throughput, a cache queue length, and a quantity of on-line authenticated users of the current first communications standard.

20. The apparatus according to claim 19, wherein the instructions to determine whether the second communications standard will be used to transmit service data comprise instructions to:
  compare the characteristic with a corresponding preset threshold; and
  determine that the second communications standard will be used to transmit the service data in response to the characteristic being greater than the corresponding preset threshold.

21. The apparatus according to claim 17, wherein the instructions further comprise instructions to:
  measure a latency between the apparatus and the second convergence control apparatus; and
  adjust, according to the latency, a duration of a timeout corresponding to the second convergence control apparatus.

22. The apparatus according to claim 21, wherein the instructions to adjust the duration of the timeout comprise instructions to:
  send, to the second convergence control apparatus, a detection message that carries a sending time, the detection message requesting that the second convergence control apparatus return, after receiving the detection message, a response message that carries a receiving time;
  receive the response message; and
  calculate a latency between the apparatus and the second convergence control apparatus according to the sending time and the receiving time.

23. The apparatus according to claim 17, wherein the instructions further comprise instructions to:
  discard a to-be-transmitted data packet in response to the second convergence control apparatus determining that the to-be-transmitted data packet is already transmitted using the second communications standard.

24. The apparatus according to claim 17, wherein the instructions further comprise instructions to:

receive an acknowledgement feedback message or a negative acknowledgement feedback message sent by the second convergence control apparatus, wherein the acknowledgement feedback message is a message sent by the second convergence control apparatus after confirming correct transmission of the preset proportion of the service data, and the negative acknowledgement feedback message is a message sent by the second convergence control apparatus after confirming incorrect transmission of the preset proportion of the service data.

* * * * *